(12) United States Patent
Toguyeni

(10) Patent No.: US 11,566,745 B2
(45) Date of Patent: Jan. 31, 2023

(54) ELECTROFUSION OF PIPE LINERS

(71) Applicant: Acergy France SAS, Suresnes (FR)

(72) Inventor: Gregory Alexandre Toguyeni, La Garenne-Colombes (FR)

(73) Assignee: ACERGY FRANCE SAS, Suresnes (FR)

( * ) Notice: Subject to any disclaimer, the term of this patent is extended or adjusted under 35 U.S.C. 154(b) by 0 days.

(21) Appl. No.: 16/955,743

(22) PCT Filed: Dec. 17, 2018

(86) PCT No.: PCT/IB2018/001570
§ 371 (c)(1),
(2) Date: Jun. 18, 2020

(87) PCT Pub. No.: WO2019/123010
PCT Pub. Date: Jun. 27, 2019

(65) Prior Publication Data
US 2021/0071808 A1    Mar. 11, 2021

(30) Foreign Application Priority Data
Dec. 19, 2017    (GB) ..................... 1721301

(51) Int. Cl.
F16L 58/10    (2006.01)
B29C 35/08    (2006.01)
(Continued)

(52) U.S. Cl.
CPC ...... *F16L 58/1045* (2013.01); *B29C 35/0805* (2013.01); *B29C 63/0004* (2013.01);
(Continued)

(58) Field of Classification Search
CPC ....... F16L 47/03; F16L 55/18; F16L 55/1645; F16L 58/1045; F16L 59/15; F16L 13/02;
(Continued)

(56) References Cited

U.S. PATENT DOCUMENTS 4,728,223 A * 3/1988 Rice .......................... E03F 3/06
405/184.2
2011/0193339 A1    8/2011 Kenworthy
(Continued)

FOREIGN PATENT DOCUMENTS

EP    0 366 299    5/1990
GB    2 323 145    9/1998
(Continued)

*Primary Examiner* — Patrick F Brinson
(74) *Attorney, Agent, or Firm* — Levy & Grandinetti

(57) ABSTRACT

A method of joining together liner sections within a polymer-lined pipe energises an induction coil inside the pipe to spot-heat part of a circumferential interface between the liner sections. This melts and fuses the polymer material locally. The induction coil is then moved along the interface to heat other parts of the interface successively above the melting temperature. An apparatus for performing the method has a power supply for energising the induction coil and a drive system for moving the energised induction coil relative to a body of the apparatus. The apparatus may be configured as a carriage that is movable along the pipe.

20 Claims, 3 Drawing Sheets

Figure 1:
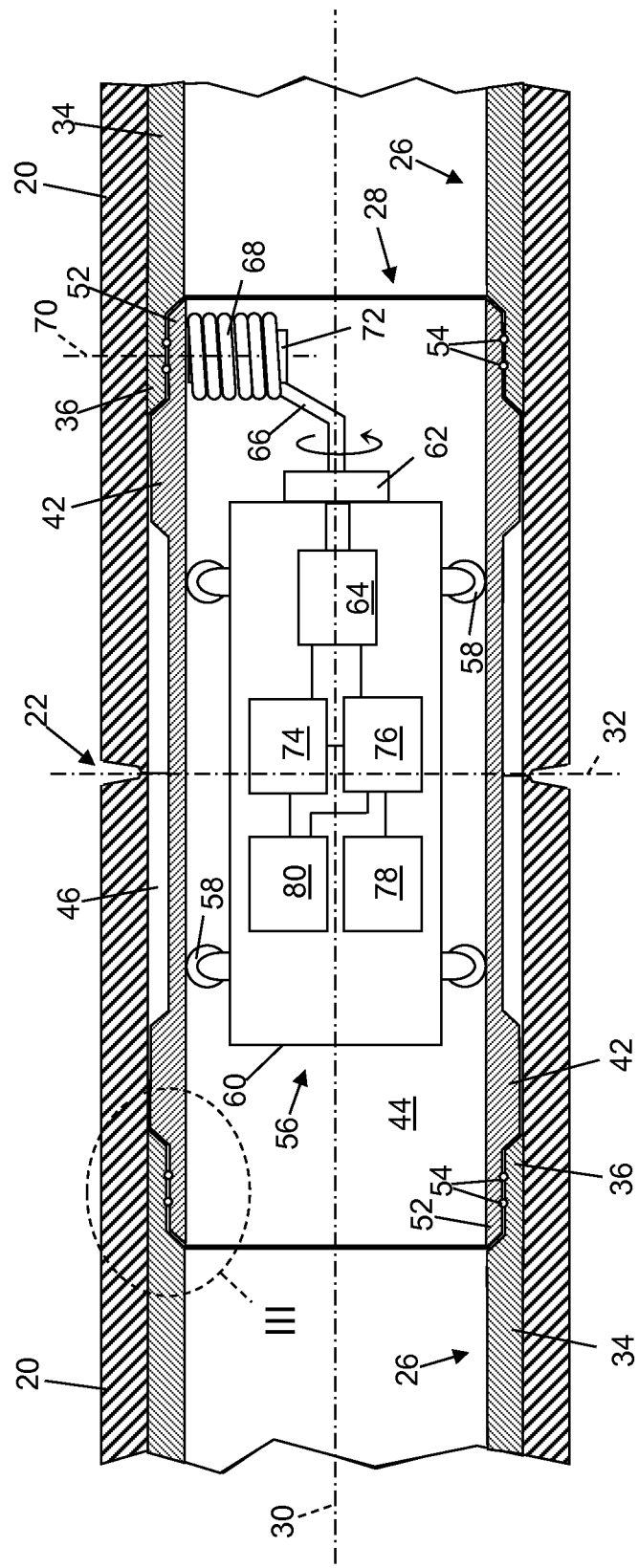

(51) Int. Cl.
   *B29C 63/00*       (2006.01)
   *B29C 63/34*       (2006.01)
   *F16L 59/14*       (2006.01)
(52) U.S. Cl.
   CPC ............ *B29C 63/34* (2013.01); *F16L 59/143* (2013.01); *B29C 2035/0811* (2013.01)
(58) Field of Classification Search
   CPC .. F16L 2101/18; B29C 65/36; B29C 35/0805; B29C 63/0004; B29C 2035/0811; B29C 2035/0822
   USPC .................. 138/97, 98; 285/21.2; 405/184.1
   See application file for complete search history.

(56) References Cited

U.S. PATENT DOCUMENTS

| | | | | |
|---|---|---|---|---|
| 2013/0114945 | A1* | 5/2013 | Pionetti | B29C 66/1282 |
| | | | | 392/472 |
| 2017/0210059 | A1* | 7/2017 | Pionetti | F16L 13/0263 |
| 2019/0283338 | A1* | 9/2019 | Pionetti | B29C 65/36 |
| 2019/0316721 | A1* | 10/2019 | Barnes | B29C 66/53241 |

FOREIGN PATENT DOCUMENTS

| | | | |
|---|---|---|---|
| GB | 2554866 | 4/2018 | |
| JP | H06-281057 | 10/1994 | |
| KR | 1020100094916 | 8/2010 | |
| KR | 101004967 | 1/2011 | |
| KR | 101030477 | 4/2011 | |
| KR | 101226591 | 1/2013 | |
| RU | 2 079 033 | 5/1997 | |
| WO | WO 2010/041016 | 4/2010 | |
| WO | WO 2013/136062 | 9/2013 | |
| WO | WO-2015008028 A1 * | 1/2015 | ......... B29C 65/3432 |
| WO | WO 2018/065769 | 4/2018 | |
| WO | WO 2018083397 | 5/2018 | |

* cited by examiner

ELECTROFUSION OF PIPE LINERS

This invention relates to pipes with polymer liners, and in particular to the challenges of using electrofusion to join together abutting sections of such liners within a surrounding pipe. This may, for example, involve fusing a liner bridge to adjoining parent liners when lengths of lined pipe are welded together end-to-end.

Corrosion protection is a key issue for pipelines used in the oil and gas industry, which are usually made of carbon steel to reduce cost over often great lengths. Polymer liners are used to mitigate internal corrosion of such pipelines, as an alternative to more expensive liners of corrosion-resistant alloys. Polymer liners also aid thermal insulation of the pipeline, which may be an important factor in subsea applications. Such liners may be of fibre-reinforced composites or solid plastics, for example high-density polyethylene (HDPE).

When fabricating a lined pipeline, it is necessary for lengths of lined steel pipe to be welded together while maintaining a continuous corrosion-resistant internal surface between them. In this respect, welding polymer-lined steel pipes is not straightforward because the liner may be damaged by the heat of welding. Additional bridging parts, namely liner bridges, are therefore required to ensure continuity between the parent liners of the pipes. A typical liner bridge is disclosed in EP 0366299.

The interfaces between the parent liners and the liner bridge have to be sealed to close a potential leak path for the pressurised fluid that will be carried by the pipe in use. Sealing may be achieved mechanically, by bonding or by electrofusion. The present invention is particularly concerned with electrofusion, for which the prior art background will now be described.

As one example of background prior art, WO 2010/041016 discloses an electrofusion fitting that serves as a liner bridge to connect parent liners before the surrounding metal pipes are welded together. The fitting is a sleeve of a thermoplastics material that includes heating coils at each end.

In use, the parent liners are machined back from the end of each pipe to create a socket or recess. The electrofusion fitting is inserted into the recess in the end of one pipe to abut its parent liner. Then, current is passed through the heating coils via electrical leads that extend through the fitting. This causes the thermoplastic materials of the fitting and the parent liner near the coils to melt and fuse together. The process is repeated to fuse the fitting to the parent liner of the other pipe, after which the metal pipes themselves are welded together around their circumferential interface.

To mitigate the risk that electrical leads extending through an electrofusion fitting could create a leak path, other techniques have been developed to deliver electrical power to the heating coils of such a fitting. For example, electrical leads could extend outwardly through a gap between pipes held end-to-end. However, open-bevel weld preparation has fallen out of favour in modern subsea pipeline fabrication.

External energisation of an electrofusion fitting is not simple to achieve in the closed-bevel automatic pipeline welding techniques that are now prevalent in the industry. WO 2013/136062 addresses this problem by drilling a hole through a closed bevel to provide access for a probe to supply electrical power to an electrofusion fitting within the abutting lined pipes. Once the fitting has been fused to the adjoining parent liners, the probe can then be withdrawn from the hole, which will be filled during the subsequent welding process.

In a more recent approach, UK Patent Application No. 1616902.1 describes how the heating coil of an electrofusion fitting can be energised and heated wirelessly by electromagnetic induction. Advantageously, this removes the requirement for direct electrical connection to the heating coils when joining sections of lined pipe. In this proposal, electromagnetic induction is effected by a coil that is concentric with the heating coils of the liner bridge. However, it has been found that the magnetic field necessary to generate sufficient heat is so large that it consumes a great deal of electrical power.

In more distant prior art, KR101226591 and JPH06281057 each disclose apparatus for heating a pipe by induction, which apparatus would not be suitable for energising the heating coils of electrofusion fittings.

Against this background, the invention provides a method of joining together liner sections of polymer material within a lined pipe. The method comprises energising an induction coil disposed within the pipe to heat only a portion of an elongate interface between the liner sections. This may be achieved by generating heat locally in at least one heating element positioned at the interface. That portion of the interface is thereby heated above a melting temperature of the polymer material of the liner sections, at which that material melts and fuses locally.

The induction coil is then moved along the interface to heat successive portions of the interface above the melting temperature. Again, this may be achieved by generating heat locally in at least one heating element positioned at each of said successive portions of the interface. The same heating element preferably extends between the various portions of the interface, although the portions of the interface could instead have separate or individual heating elements.

Advantageously, a previously-heated portion of the interface may be allowed to cool below the melting temperature while the induction coil heats another portion of the interface above the melting temperature.

The induction coil may, for example, be moved circumferentially along the interface within the pipe. This may involve pivoting the induction coil around a central longitudinal axis of the pipe.

For optimal heating of the interface, the induction coil is preferably supported such that a longitudinal axis of the coil is substantially orthogonal to the interface. Where the interface is curved, the induction coil may be mounted pivotably or rotatably to keep its axis substantially orthogonal to the interface as the induction coil moves along the interface.

Elegantly, longitudinal alignment between the induction coil and the interface may be determined by sensing magnetic field fluctuations of the induction coil. In that case, the induction coil may be moved longitudinally within the pipe in response to the determined degree of longitudinal alignment or misalignment.

More generally, the induction coil may be moved longitudinally along the pipe between separate interfaces. Alternatively, the method of the invention may be performed simultaneously at two or more interfaces by a plurality of induction coils each moving along a respective one of the interfaces.

The induction coil may, for example, be supported on a carriage that is moved along and within the pipe to align the induction coil with the interface. Then, the induction coil may be moved, when energised, relative to the carriage to follow the interface.

The method of the invention is apt to be used when interposing a liner bridge between parent liners of lengths of lined pipe, in which case the liner sections are the liner bridge and the parent liners. The lined pipe lengths may be brought together around the liner bridge at a closed bevel, whereupon the liner bridge may be joined to the parent liners along respective interfaces.

The lengths of the lined pipe may be welded together at any convenient stage, for example while joining the liner sections along the interface.

The inventive concept also finds expression in apparatus for joining together liner sections of polymer material within a lined pipe. The apparatus comprises: a body; an induction coil supported by the body; a power supply for energising the induction coil; and a drive system for moving the energised induction coil relative to the body. The induction coil may, for example, be supported by an arm or linkage extending from an end or side of the body.

Conveniently, the drive system is arranged to pivot the induction coil about a pivot axis relative to the body. In that case, the induction coil may be coiled about an axis that is substantially orthogonal to the pivot axis.

The body of the apparatus is suitably configured to fit within and to move longitudinally along a surrounding pipe substantially without lateral movement, while maintaining the pivot axis substantially coincident with the central longitudinal axis of the pipe. The body could support a plurality of longitudinally-spaced induction coils.

The apparatus may further comprise an alignment sensor that is arranged to sense magnetic field fluctuations of the induction coil.

An objective of the invention is to allow fusion-bonding of a liner bridge to a parent pipe liner, which may be of HDPE or other fusible material, without requiring electrical connectors that pass through an opening in a weld joint of the surrounding carbon steel pipe. Typically, a closed J-bevel is required for narrow-gap mechanised welding of polymer-lined steel pipe. This means that a fusion bonding process for joining the liner bridge to the parent liner has to be activated from inside the pipe.

The invention applies spot induction heating inside the pipe to generate enough heat in electrical conductors at the interface between the parent liner and the liner bridge to achieve fusion bonding. For this purpose, a reduced-size induction coil, which may be fitted with an appropriate field concentrator, may be mounted on an internal tool such as a trolley or carriage that can be manoeuvred independently within the pipe. Alternatively, the induction coil may be connected to, or integrated with, an internal clamping system. Suitable induction coils are known for heating metallic parts, such as parts to be welded or heat-treated.

The induction coil and trolley are designed to perform full-circumference heating via rotation of a mobile part of the trolley. This mobile part supports the coil and keeps the coil positioned at an appropriate selected distance from the inner surface of the liner bridge. The heating operation can be performed simultaneously to girth welding of the outer pipe or before or after that girth-welding operation. The trolley is then moved axially inside the pipe to the next joint location; alternatively the trolley can fitted with two induction coils so as to fuse joints at both ends of a liner bridge simultaneously.

The electrical conductors to be heated by the induction coil can be pre-fitted on the liner bridge so as to be positioned at the interface between the liner bridge and the parent liner, and hence in contact with both. Alternatively, the conductors can be embedded just beneath the surface of the liner bridge at the joint location. The conductors can be wires of an electrically-conductive material or may be of another cross-sectional shape, such as strips.

Thus, the present invention improves upon inductively-driven prior art solutions by providing just the minimum electro-magnetic field required to generate sufficient heat in the heating coil by induction.

Preferred embodiments of the invention implement a method for connecting two steel pipes lined by a polymer liner. The method comprises: inserting a polymer bridging insert into the end of a first lined pipe so that a first end of the bridging insert overlaps the liner of said first lined pipe wherein the bridging insert overlap contains at least one heating wire; abutting the second lined pipe to the first lined pipe wherein a second end of the bridging insert overlaps the liner of said second lined pipe; and butt-welding said first and second lined pipe. The method also comprises: inserting a carriage with a rotating induction coil inside the bore of said lined pipes, said induction coil axis being substantially radial to the pipes axis; aligning said induction coil with the heating wire of at least the first bridging insert overlap; and rotating said induction coil while energizing it in order to generate a magnetic field that in turn energizes the heating wire that fuses the liner and the bridge. For example, the heating wire may be a coil that is concentric with the central longitudinal axis of the pipe.

Preferred embodiments of the invention also provide a tool for connecting the polymer liner of a steel lined pipe to a polymer bridging insert in an end of said pipe, the polymer bridging insert comprising heating wire or other heating elements. The tool comprises: an inner carriage designed to circulate inside the bore of the lined pipe; and an induction coil mounted on said carriage; wherein the induction coil axis is radial to the direction of the pipe and the induction coil axis can rotate around the inner circumference of the pipe.

Variation of magnetic field in the induction coil may be used to detect longitudinal alignment with the heating wire of the bridging insert.

In summary, the method of the invention comprises energising an induction coil inside a polymer-lined pipe to spot-heat part of a circumferential interface between the liner sections. This melts and fuses the polymer material locally. The induction coil is then moved along the interface to heat other parts of the interface successively above the melting temperature. Apparatus for performing that method comprises a drive system for moving the energised induction coil relative to a body of the apparatus. The apparatus may be configured as a carriage that is movable along the pipe.

Figure 2:
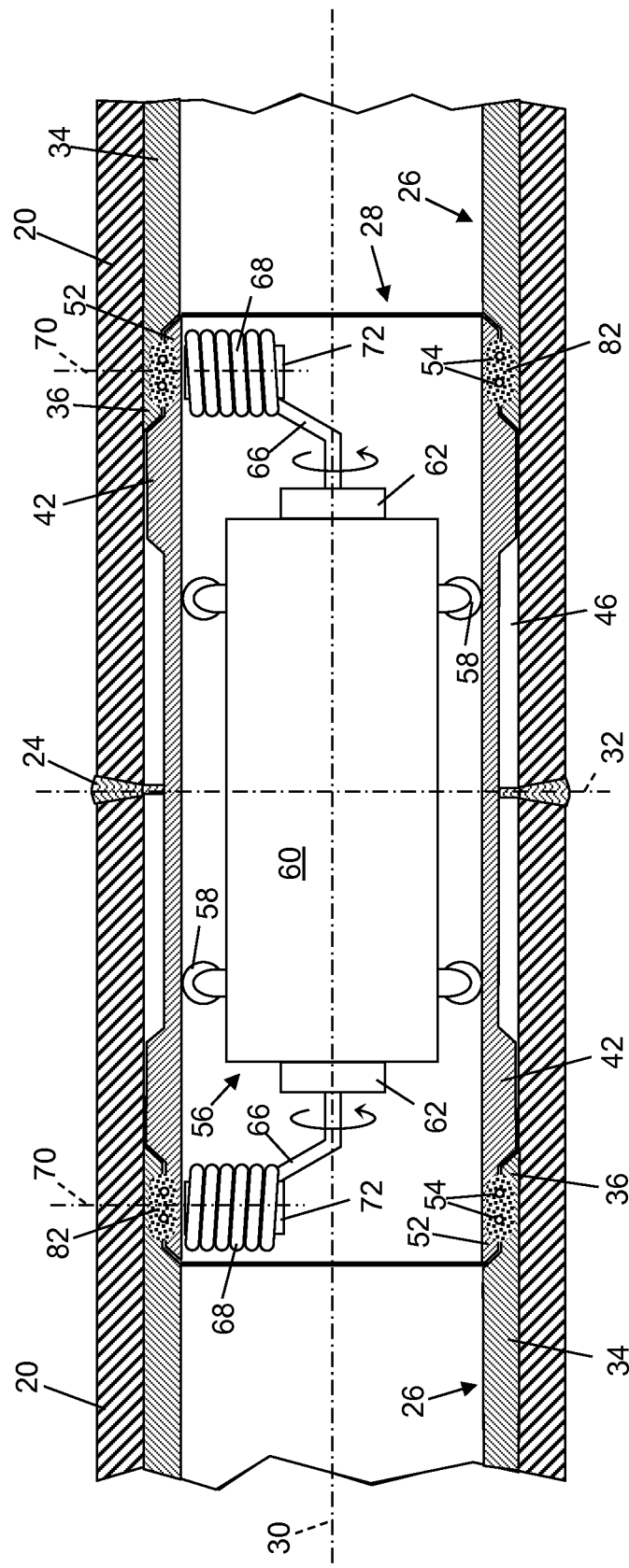
Figure 3:
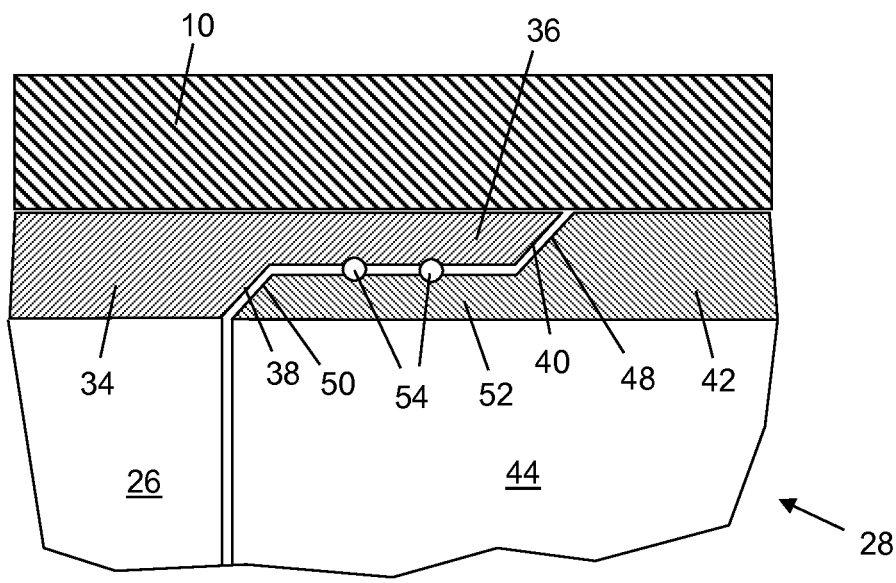
Figure 4:
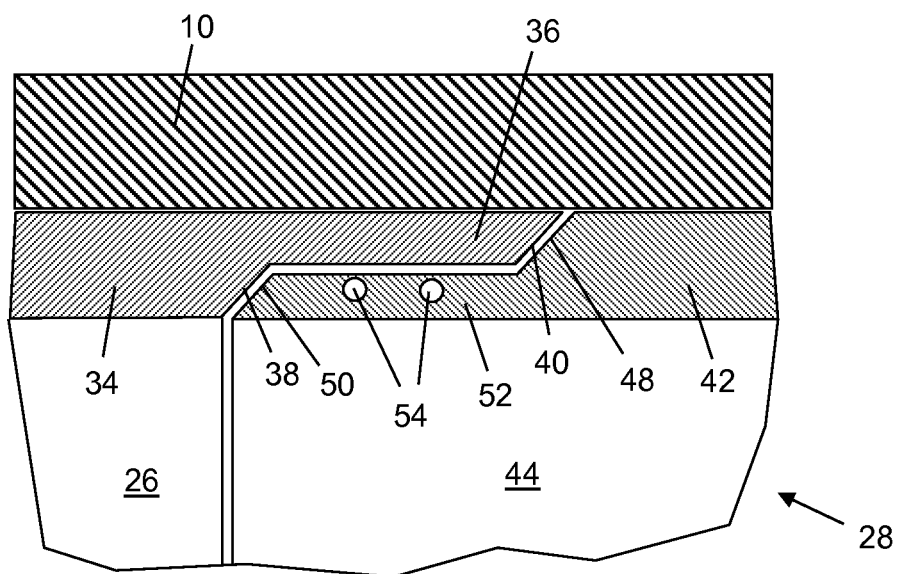

In order that the invention may be more readily understood, reference will now be made, by way of example, to the accompanying drawings, in which:

FIG. 1 is a schematic side view, in partial longitudinal section, of a joint between abutting lengths of lined pipe, including a tool in accordance with the invention for fusing a liner bridge between parent liners of the pipe lengths;

FIG. 2 corresponds to FIG. 1 but shows a variant of the tool being used to fuse the liner bridge between parent liners when a weld has been, or is being, made between the abutting lengths of lined pipe;

FIG. 3 is an enlarged detail view of an overlapping interface between the liner bridge and a parent liner, corresponding to Detail III of FIG. 1; and FIG. 4 corresponds to FIG. 3 but shows a variant of the interface.

FIG. 1 of the drawings shows two lined pipes 20 of carbon steel abutting end-to-end at a closed bevel 22 between the pipes 20, ready to be joined by a circumferential girth weld 24 as shown in the variant of FIG. 2. Each pipe 20 contains a parent liner 26 of thermoplastics material, for example HDPE.

The abutting pipes 20 enclose a generally tubular electrofusion fitting 28 that extends between, and will be fused to, their parent liners 26 to maintain a substantially continuous corrosion-resistant inner surface. For this purpose, the electrofusion fitting 28 comprises an elongate tube that is machined or moulded from a polymer material. The polymer material of the electrofusion fitting 28 is preferably the same as, or at least compatible with, the material of the parent liners 26, thus for example also being of HDPE.

As best appreciated in the enlarged detail view of FIG. 3, the parent liners 26 have interface formations machined into their opposed ends. The interface formations of the parent liners 26 mate with inverse complementary interface formations on the opposed ends of the electrofusion fitting 28.

All of the interface formations of the parent liners 28 and the electrofusion fitting 28 are rotationally symmetrical around a common central longitudinal axis 30 of the pipes 20. All of those interface formations are also in mirrored relation about a central transverse plane 32 that is orthogonal to the central longitudinal axis 30, that plane 32 being aligned with the interface between the pipes 20 when the electrofusion fitting 28 is in situ as shown in FIGS. 1 and 2.

Specifically, each parent liner 26 terminates short of an end of the associated pipe 20 and has a stepped profile in longitudinal section. The stepped shape is defined by a full-thickness body portion 34 and a reduced-thickness end portion 36. This creates an annular step 38 between the body portion 34 and the end portion 36 of the parent liner 26 and another annular step 40 between the end portion 32 and the inner wall of the pipe 20. In cross-section, the steps 38, 40 are concentric with respect to the central longitudinal axis 30.

The electrofusion fitting 28 has a complementarily-stepped profile in longitudinal section. Internally, the electrofusion fitting 28 is plain and parallel-walled. Externally, the electrofusion fitting 28 has a pair of circumferential integral hoops 42 that protrude radially from the tubular body 44 of the electrofusion fitting 28 inboard of its ends. The hoops 42 are parallel to, and spaced symmetrically from, each other about the central transverse plane 32.

An annular insulator recess 46 is defined between the hoops 42 in alignment with the bevel 22 and hence the weld 24. Thermally-insulating material may be positioned in the insulator recess 46 to protect the electrofusion fitting 28 from radiant heat during weld preparation and the welding process itself.

An outboard side of each hoop 42 defines an outer annular step 48 that opposes the step 40 between the end portion 32 of a parent liner 24 and the inner wall of the associated pipe 20. Each end of the body 44 of the electrofusion fitting 28 defines an inner annular step 50 that opposes the step 38 between the body portion 34 and the end portion 36 of the parent liner 26. In cross-section, the steps 48, 50 are also concentric with respect to the central longitudinal axis 30.

The steps 38, 40, 48, 50 are preferably radiused or chamfered as shown in the drawings to ease insertion of the electrofusion fitting 28 into the ends of the pipes 20.

End portions 52 of the body 44 of the electrofusion fitting 28, which extend longitudinally between the steps 48, 50 outboard of the hoops 42, are received telescopically within the reduced-thickness end portions 36 of the parent liners 26. Here, circumferential heating elements 54 extend continuously around the end portions 52 of the body 44, hence facing radially outwardly toward the end portions 36 of the parent liners 26.

It will therefore be apparent that the interface formations of the opposed parent liners 26 comprise female interface elements that mate telescopically with male interface elements defined by the complementary formations of the electrofusion fitting 26. The heating elements 54 are positioned where there is a substantial male-female overlap between the electrofusion fitting 28 and the parent liners 26, specifically where the projecting end portions 52 of the electrofusion fitting 28 extend axially outwardly beyond the hoops 42.

When assembling a pipeline for welding, the electrofusion fitting 28 is inserted into the end of a pipe 20 whose parent liner 26 has been prepared as shown in FIG. 1, with half of the electrofusion fitting 28 protruding from the pipe 20. Then, a second similarly-prepared pipe 20 is brought together into end-to-end abutment with the first pipe 20 while surrounding and locating the electrofusion fitting 26 as shown in FIG. 1. Subsequently, the pipes 20 are welded together at the bevel 22 after any necessary further preparation.

FIG. 1 also shows a fusing tool 56 of the invention advanced within the abutting pipes 20 to be positioned at least partially within the electrofusion fitting 28. The tool 56 may be self-propelled or may be advanced into the pipes 20 by, or integrated with, other apparatus that moves within the pipe, such as a line-up clamp.

In this much-simplified view, the fusing tool 56 is represented schematically as a self-contained unit that runs along the inside of the pipes 20 by virtue of wheels 58 that bear against the inner surface of the parent liners 26 and the electrofusion fitting 28. The wheels 58 facilitate longitudinal movement of the fusing tool 56 but resist angular movement of a body 60 of the fusing tool 56 around the central longitudinal axis 30.

The body 60 of the fusing tool 56 supports a rotary drive system 62 that is driven around the central longitudinal axis 30 by an on-board motor/gearbox unit 64. A radially-extending support arm 66 fixed to the rotary drive system 62 at one end of the body 60 supports an induction coil 68. The induction coil 68 therefore turns with the rotary drive system 62 about the central longitudinal axis 30 to sweep circumferentially around the inside of the electrofusion fitting 28.

The induction coil 68 is coiled around a substantially radial coil axis 70 that is, therefore, substantially orthogonal to the central longitudinal axis 30. The induction coil 68 is fitted with a field concentrator 72. When the induction coil 68 is energised, the field concentrator 72 concentrates and projects the magnetic field of the induction coil 68 radially outwardly along the axis 70.

A radially outer end of the induction coil 68 is held close to the inner surface of an end portion 52 of the electrofusion fitting 28, in longitudinal alignment with the heating elements 54 that are supported by that end portion 52. Thus, the axis 70 of the induction coil 68 is substantially orthogonal to the opposed part of the electrofusion fitting 28.

Aided by the field concentrator 72, the energised induction coil 68 promotes strong local heating in the heating elements 54 of the electrofusion fitting 28 that are opposed to the induction coil 68 along the axis 70. Heat generated in that part of the heating elements 54 is conducted into the adjacent parts of the electrofusion fitting 28 and the associated parent liner 26, which thereby melt and fuse together.

The induction coil 68 is held at a circumferential position for long enough to initiate fusing and is then advanced circumferentially at a speed determined to promote and extend fusing along the interface between the electrofusion fitting 28 and the associated parent liner 26. In this way, when the induction coil 68 completes a full circumferential circuit, the electrofusion fitting 28 is sealed to the parent liner 26.

As its circumferential sweep progresses, the induction coil 68 moves away from an already-fused part of the interface. The already-fused part of the interface is thereby left to cool and harden. Applying heat locally and progressively along the interface in this way therefore saves electrical power and reduces cooling time, to the benefit of cycle times during pipeline fabrication.

The fusing tool 56 can then be moved longitudinally to fuse another interface in a similar manner, in particular the interface between the electrofusion fitting 28 and the parent liner 26 of the other pipe 20.

The body 60 of the fusing tool 56 contains a power supply 74 that powers the motor/gearbox unit 64 and that energises the induction coil 68. A controller 76 controls the fusing process by controlling the operation and speed of the motor/gearbox unit 64 and the power supplied to the induction coil 68.

The controller 76 is responsive to a set of sensors 78 that provide control feedback signals. The sensors 78 may, for example, include a temperature sensor that measures the local temperature of the interface between the electrofusion fitting 28 and the associated parent liner 26. The sensors 78 may also include a magnetic field sensor that senses variation of magnetic field in the induction coil 68.

Fluctuation of the magnetic field in the induction coil 68 may be used to detect longitudinal alignment, or misalignment, of the induction coil 68 with the heating elements 54 of the electrofusion fitting 28. This enables the controller 76 to control an optional on-board drive system 80 that may drive at least one of the wheels 58 to move the fusing tool 56 longitudinally to position the induction coil 68 as appropriate. Alternatively, the controller 76 can provide positional feedback to an external control system so that an external drive system can position the fusing tool 56 appropriately instead.

FIG. 2 shows a variant in which the fusing tool 56 is fitted with induction coils 68 at both ends of the body 60. The induction coils 68 can be moved individually or together to fuse and seal the electrofusion fitting 28 to both of the parent liners 26 simultaneously.

As noted above, FIG. 2 shows the weld 24 between the pipes 20 now completed. The weld 24 may be completed before, during or after fusing together the electrofusion fitting 28 and the parent liners 26. FIG. 2 also shows fused regions 82 around the heating elements 54 that join the electrofusion fitting 28 and the parent liners 26.

In the detail shown in FIG. 3, the heating elements 54 are located in circumferential locating grooves 84 to protrude radially outwardly from the end portions 52 of the body 44. This holds the heating elements 54 in direct contact with both the electrofusion fitting 28 and the surrounding end portion 36 of the parent liner 26. Direct contact maximises thermal conduction between the heating elements 54 and the materials of the electrofusion fitting 28 and the parent liners 26.

In the variant shown in similar detail in FIG. 4, the heating elements 54 are embedded shallowly in the end portions 52 of the body 44. This places the heating elements 54 close to the surface of each end portion 52 and hence close to the surrounding end portion 36 of the parent liner 26. This positioning protects the heating elements 54 but is close enough to ensure adequate thermal conduction between the heating elements 54 and the material of the parent liner 26.

Many other variations are possible within the inventive concept. For example, the fusing tool could move along the abutting pipes on articulated tracks instead of, or in addition to, wheels. Also, the fusing tool could be equipped with clamp shoes that move radially outwardly into engagement with the surrounding parent liners and the electrofusion fitting. Such shoes would lock the fusing tool against longitudinal or angular movement along or around the central longitudinal axis when the tool is being used to fuse the electrofusion fitting to the parent liners.

It is also possible to apply internal cooling within the abutting pipes to control the temperature of the electrofusion fitting. Cooling the electrofusion fitting during the welding process may not be necessary if welding variables are chosen appropriately. However, internal cooling of the electrofusion fitting may be advantageous to allow faster welding while keeping the thermoplastics material of the fitting well below its softening temperature. In principle, such cooling could be provided via the fusing tool of the invention.

The invention claimed is:

1. A method of joining together liner sections of polymer material within a lined pipe comprises:
   energising an induction coil disposed within the pipe to heat a portion of an elongate interface between the liner sections by generating heat locally in at least one heating element positioned at the interface;
   heating said portion of the interface above a melting temperature of the polymer material, at which the polymer material of the liner sections melts and fuses locally; and
   moving the induction coil circumferentially along the interface within the pipe to heat successive portions of the interface above the melting temperature by generating heat locally in at least one heating element positioned at each of said successive portions of the interface.

2. The method of claim 1, comprising allowing a previously heated portion of the interface to cool below the melting temperature while the induction coil heats another portion of the interface above the melting temperature.

3. The method of claim 1, comprising pivoting the induction coil around a central longitudinal axis of the pipe.

4. The method of claim 1, wherein the induction coil is coiled around a coil axis and is supported such that the coil axis is substantially orthogonal to the interface.

5. The method of claim 4, wherein the interface is curved and the induction coil is mounted pivotally to keep the axis substantially orthogonal to that interface as the induction coil moves along the interface.

6. The method of claim 1, comprising determining a degree of longitudinal alignment between the induction coil and the interface by sensing magnetic field fluctuations of the induction coil.

7. The method of claim 6, comprising moving the induction coil longitudinal within the pipe in response to the determined degree of longitudinal alignment.

8. The method of claim 1, comprising advancing the induction coil longitudinally along the pipe between separate interfaces.

9. The method of claim 1, performed simultaneously at two or more interfaces by a plurality of induction coils each moving along a respective one of the interfaces.

10. The method of claim 1, comprising:
supporting the induction coil a carriage;
moving the carriage along and within the pipe;
aligning the induction coil with the interface; and
moving the energised induction coil relative to the carriage to follow the interface.

11. The method of claim 1, comprising:
interposing a liner bridge between parent liners of lengths of the lined pipe, the liner bridge and the parent liners being said liner sections;
bringing together the lined pipe lengths around the liner bridge at a closed bevel; and
joining the liner bridge to the parent liners along respective interfaces.

12. The method of claim 1, further comprising welding together lengths of the lined pipe.

13. The method of claim 12, comprising welding together the lined pipe lengths while joining the liner sections along the interface.

14. An apparatus for joining together liner sections of polymer material within a lined pipe comprises:
a body;
an induction coil supported by the body;
a power supply for energising the induction coil to heat a portion of an elongate interface between the liner sections by generating heat locally in at least one heating element positioned at the interface; and
a drive system for moving the energised induction coil relative to the body.

15. The apparatus of claim 14, wherein the drive system is arranged to pivot the induction coil about a pivot axis relative to the body.

16. The apparatus of claim 15, wherein the induction coil is coiled about a coil axis that is substantially orthogonal to the pivot axis.

17. The apparatus of claim 15, wherein the body is configured to fit within and to move longitudinally along a surrounding pipe substantially without lateral movement, while maintaining the pivot axis substantially coincident with the central longitudinal axis of the pipe.

18. The apparatus of claim 14, wherein the induction coil is supported by an arm extending from an end of the body.

19. The apparatus of claim 14, further comprising an alignment sensor that is arranged to sense magnetic field fluctuations of the induction coil.

20. The apparatus of claim 14, wherein the body supports a plurality of longitudinally spaced induction coils.

* * * * *